Feb. 25, 1958 A. F. DELLHEIM ET AL 2,824,781
EXTRUSION PROCESS
Filed Nov. 17, 1953 2 Sheets-Sheet 1
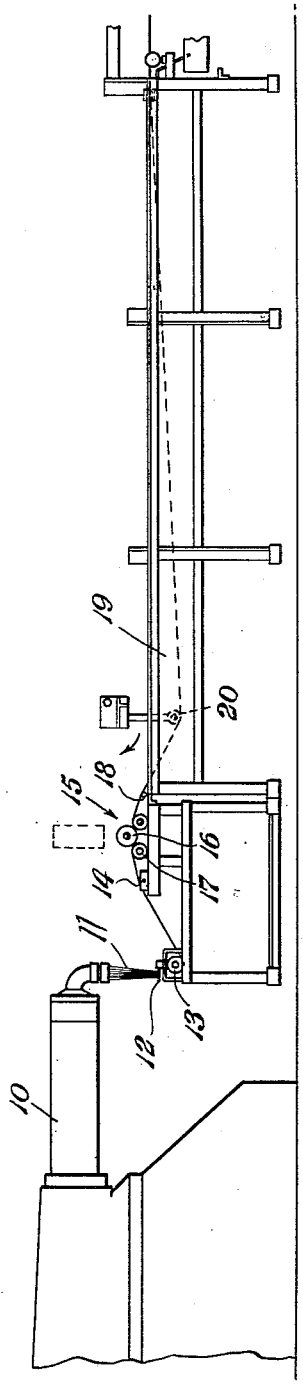
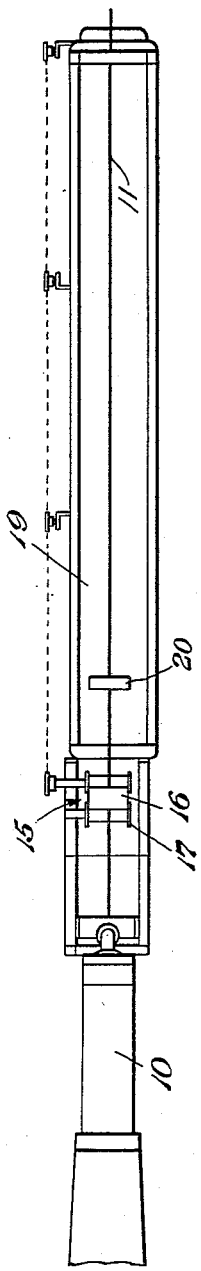
INVENTORS
ARTHUR F. DELLHEIM
AND LEE F. SAMLER
BY Karl W. Flocks
ATTORNEY Feb. 25, 1958  A. F. DELLHEIM ET AL  2,824,781
EXTRUSION PROCESS Filed Nov. 17, 1953  2 Sheets-Sheet 2

INVENTORS
ARTHUR F. DELLHEIM
AND LEE F. SAMLER

BY  Karl W. Flocks

ATTORNEY

2,824,781

EXTRUSION PROCESS

Arthur F. Dellheim and Lee F. Samler, Baltimore, Md., assignors to The National Plastics Products Company, Odenton, Md., a corporation of Maryland Application November 17, 1953, Serial No. 392,618

3 Claims. (Cl. 18—54)

This invention relates to a process for the manufacture of filaments from brittle artificial masses like aryl olefine polymerizates, especially the polystyrenes, and more particularly to the extrusion and orientation of polystyrene monofilaments.

It has been previously proposed to produce polystyrene filaments by extruding molten polystyrene through a die and then pulling off the extruded material at a higher speed to effect orientation. Such prior processes have been expensive due to the cumbersome path of the filaments requiring a great deal of time in threading a plurality of filaments about the many idler rolls and snubbing rolls which were immersed in the heating bath each time the process is started up or when there is a break in a filament. Further, these processes are not continuous due to the requirement for annealing the filaments after they have collected on the wind-up rolls. In addition, square wind-up rolls are generally used, so that after annealing it is necessary to cut away the portion of the filaments adjacent the square corners of the wind-up rolls.

It is an object of the present invention to provide an improved apparatus and process for the manufacture of polystyrene filaments in which the requirement for annealing has been eliminated.

It is a further object of the present invention to provide an improved apparatus and process for the manufacture of polystyrene filaments in which the starting up time is greatly reduced.

It is a still further object of the present invention to provide an improved process and equipment for orienting polystyrene filaments such that an improved product is produced.

It is a still further object of the present invention to provide wind-up rolls and a process of operation that eliminates the waste previously experienced in cutting away bends in the final product.

Other objects and the advantages of this invention will be apparent upon consideration of the following detailed description of a preferred embodiment thereof in conjunction with the annexed drawings, wherein:

Fig. 1 is a side elevational view of a portion of the apparatus embodying the present invention showing the extruder and orientation zone;

Fig. 2 is a plan view of the apparatus of Fig. 1;

Figure 3:
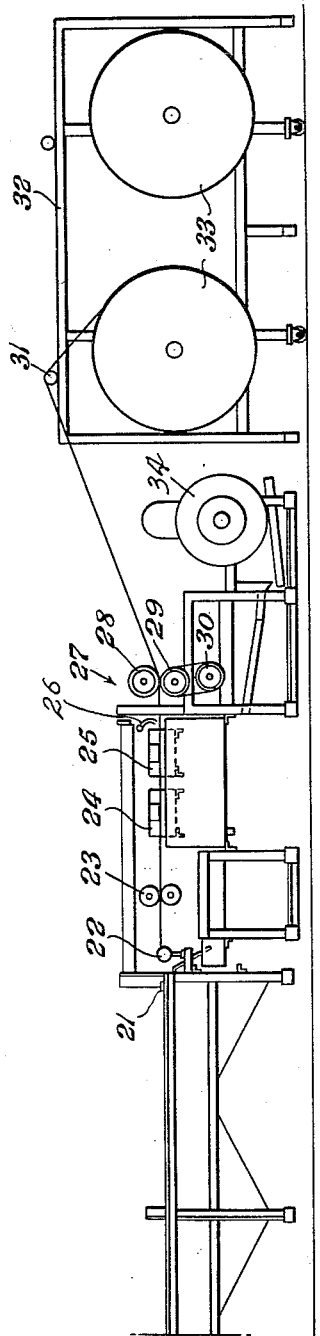
Fig. 3 is a side elevational view of the apparatus showing a continuation of Fig. 1 with parts overlapping.
Figure 4:
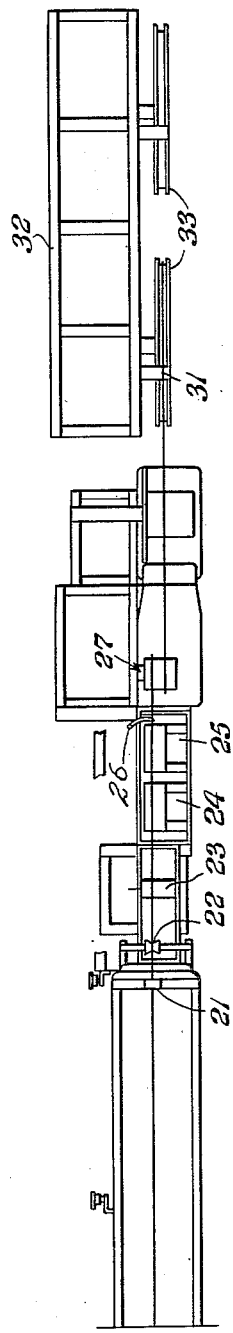
Fig. 4 is a plan view of the apparatus of Fig. 3.

Referring to the drawings, the extruder 10 is any conventional type which results in uniform melting and constant delivery to a plurality of extrusion orifices. The material fed into the extruder is first cooled by water, and then steam-heated while in the mixing torpedo. It is then oil-heated to approximately 430° F. and thence electrically heated to the extrusion temperature of 450 to 500° F. at the die. A plurality of equal diameter strands 11 are extruded vertically and downwardly, from the extruder to a water-cooled comb assembly 12, and thence about a driven temperature controlled guide roll 13. The guide roll is maintained at a temperature in the neighborhood of 180° F. which is approximately the second order transition point for polystyrene at which temperature it exists as a viscous liquid. At temperatures below 180° F. the polystyrene has been found to be too brittle to handle and at higher temperatures stresses are imparted to the resin. Likewise, at higher temperatures, the polystyrene begins to stick to the roll.

The die used on the extruder is preferably a multi-orifice die in which the orifices are arranged near the outer circumferences so that the plurality of strands are extruded downwardly in a circular configuration which flattens out at the comb assembly with a single strand passing between each tooth of the cooled comb, and the separated strands thence pass about the guide roll 13.

A comb assembly 14 is arranged between the guide roll 13 and the snub unit 15. The snub unit 15 includes a vertically adjustable upper roll 16 and a pair of driven lower rolls 17. A spring actuated tensometer assembly 18 located before the heating bath 19 is utilized to maintain constant tension on the strands during orientation. A snubbing roll 20 is pivotally mounted about a point above the heating bath 19 to permit movement of the roll from a horizontal position above the bath to a vertical position in which it is completely immersed in the bath.

The constant temperature heating bath in which the orientation takes place is maintained at a temperature between 240–260° F. The bath may be filled with a high boiling material, such as a 50% calcium chloride salt solution, triethylene glycol, or propylene glycol. The heating bath is of long narrow configuration to permit straight line flow during the entire period while the strands are maintained at a temperature above the softening temperature during orientation.

A guide 21 and wiper 22 are located at the exit from the heating bath prior to a pair of stretching rolls 23. The upper of the stretching rolls 23 is pivoted for upward movement and the lower of the stretching rolls 23 is driven. Immediately after the stretching rolls 23 are located a pair of quenching baths 24, 25. The first bath 24 is maintained at a temperature of approximately 180° F., whereas the second bath 25 is maintained at about 65° F. These tanks are provided with weirs over which the strands pass to enter the baths. An air jet 26 at the exit to the second quenching bath 25 acts to dry the strands before they pass around the stretching roll assembly 27. The stretching roll assembly 27 includes an upper pivoted roll 28, an intermediate driven roll 29 and a lower roll 30.

A guide roll 31 directs the strands from the stretching roll assembly 27 to the reel winder 32, which includes a pair of circular reels 33.

A roll 34 is located before the reel winder for use in starting up operations.

In starting up the extrusion and orientation process, the polystyrene is fed to the extruder and the tow of extruded strands is conducted over the lower driven snub rolls 17 and thence over the heating bath to the two sets of stretching rolls and thence about the roll 34 on which the material is wound. This material has not been oriented and is not suitable for use. At this time, the strands are separated manually immediately after extrusion to pass between the teeth of the comb 12 and about the guide roll 13. The upper rolls 16, 23 and 28 are lowered into contact with their lower rolls. The snubbing roll 20 is then slowly pivoted downwardly into the heating bath directing the filaments downwardly into the bath under the roll 20.

When the temperatures have become constant, the speed of the take-off roll is increased to the proper speed so that orientation of the filaments takes place in the bath. When a satisfactory product is obtained on the roll 34, the filaments being extruded and oriented are cut off and conducted over the guide roll 31 and onto the collecting reel 33.

The required speed differential is maintained between the snub rolls 15 and the stretching rolls 23 and 27 to obtain optimum results. The differential depends on the formulation used, temperature of the bath and diameter of the filaments being extruded.

The physical properties of polystyrene are considerably changed by the orientation process described heretofore, and tough, strong bristles may be formed from the rigid brittle unoriented polymer.

In utilizing the equipment and processes previously proposed, the strands formed without further treatment had a tendency to curl and it was not possible to obtain straight stress-free strands without annealing. In accordance with the present invention, when the strands are removed from the circular collecting reels, they are straight and can be used without further treatment and annealing. It is not known for certain why the annealing step is no longer required, but it is believed that annealing has been required heretofore because of the strains and stresses in the strands due to the numerous bends and turns heretofore given the strands during orientation while heated to within the softening range of 240-260° F. According to the present invention, the strands are maintained in virtually straight line flow during the orientation in the heating bath. This is accomplished by eliminating previously used numerous idler rolls and stretching rolls within the heating bath. After passing into the heating bath about the snubbing roller 20, the strands are maintained in straight line flow while the orientation takes place until after the quenching baths. After the quenching baths, there is no further problem of stresses and strains since the material has been oriented and set. Thus, it will be seen that the filaments are maintained in straight line flow during orientation while the filaments are maintained at a temperature in the softening range of the polystyrene.

In this specification and claims whenever the softening range of the polystyrene is referred to, a temperature range of approximately 240-260° F. is meant.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a process for forming and orienting polystyrene filaments, the steps of extruding molten polystyrene filaments into air, guiding the filaments into a liquid heated to a temperature of 240-260° F., stretching the filaments in said liquid cooling the filaments to a temperature below the softening range of the polystyrene, and maintaining the filaments in virtually uninterrupted straight line flow at all times that said filaments are at a temperature within the softening range of the polystyrene.

2. In a process for forming and orienting polystyrene filaments, the steps of extruding molten polystyrene filaments into air, guiding the filaments into a liquid heated to a temperature of 240-260° F., stretching the filaments while in said liquid, quenching the filaments at a temperature below the softening range of the polystyrene, and maintain said filaments in virtually uninterrupted straight line flow during and between said stretching and quenching steps.

3. In a process for forming and orienting polystyrene filaments, the steps of extruding molten polystyrene filaments, guiding the filaments into a liquid heated to a temperature of 240-260° F., stretching the filaments in said liquid, quenching the filaments at a temperature below the softening range of the polystyrene, and maintain said filaments in virtually uninterrupted straight line flow during and between said stretching and quenching steps.

References Cited in the file of this patent

UNITED STATES PATENTS

| Number | Name | Date |
|---|---|---|
| 2,064,279 | Taylor | Dec. 15, 1936 |
| 2,129,213 | Harz et al. | Sept. 6, 1938 |
| 2,436,028 | Wiegerink | Feb. 17, 1948 |
| 2,459,254 | Van der Mei | Jan. 18, 1949 |
| 2,499,421 | Samler | Mar. 7, 1950 |
| 2,544,763 | Montero | Mar. 13, 1951 |

FOREIGN PATENTS

| Number | Country | Date |
|---|---|---|
| 598,464 | Great Britain | Feb. 18, 1948 |

OTHER REFERENCES

Serial No. 715,003, Wulff et al. (A. P. C.), published April 27, 1943.